United States Patent [19]

Eberle

[11] 4,429,208
[45] Jan. 31, 1984

[54] ELECTRODES FOR USE IN THE EXTRUSION-FUSION WELDING OF LEAD PARTS THROUGH AN APERTURE IN A BATTERY CASE

[75] Inventor: William J. Eberle, Reading, Pa.

[73] Assignee: General Battery Corporation, Reading, Pa.

[21] Appl. No.: 301,950

[22] Filed: Sep. 14, 1981

Related U.S. Application Data

[63] Continuation of Ser. No. 934,046, Aug. 15, 1978, abandoned, which is a continuation-in-part of Ser. No. 790,881, Apr. 26, 1977, Pat. No. 4,166,210.

[51] Int. Cl.³ .............................................. B23K 11/30
[52] U.S. Cl. .................................. 219/78.16; 219/119
[58] Field of Search ................ 219/119, 78.15, 78.16, 219/149, 154, 91.23

[56] References Cited

U.S. PATENT DOCUMENTS

| | | | |
|---|---|---|---|
| 896,218 | 8/1908 | Lachman | 219/119 X |
| 1,061,376 | 5/1913 | Heany | 219/119 |
| 2,024,239 | 12/1935 | McBain . | |
| 2,180,396 | 11/1939 | Burke . | |
| 2,282,186 | 5/1942 | Henninger | 219/91.23 |
| 3,134,883 | 5/1964 | Bennett et al. | 219/119 X |
| 3,415,977 | 12/1968 | Bush | 219/149 |
| 3,476,611 | 11/1969 | Sabatino . | |
| 3,629,544 | 12/1971 | Becker | 219/91.23 X |
| 3,666,912 | 5/1972 | Anderson et al. . | |
| 3,687,734 | 8/1972 | Orlando et al. . | |
| 3,723,699 | 3/1973 | Allen . | |
| 3,793,086 | 2/1974 | Badger . | |
| 3,869,316 | 3/1975 | Matter . | |
| 3,909,300 | 9/1975 | Schenk, Jr. et al. . | |
| 3,909,301 | 9/1975 | Schenk, Jr. et al. . | |
| 4,013,864 | 3/1977 | Tiegel et al. | 219/80 |
| 4,046,062 | 9/1977 | Matter | 219/91.23 X |
| 4,166,210 | 8/1979 | Eberle | 219/119 X |
| 4,256,946 | 3/1981 | Eberle | 219/119 X |
| 4,352,002 | 9/1982 | Eberle | 219/119 X |

Primary Examiner—D. A. Reynolds
Assistant Examiner—Catherine M. Sigda
Attorney, Agent, or Firm—Benasutti and Murray

[57] ABSTRACT

The present invention provides a novel electrode construction, for use in extrusion-fusion type battery intercell welders, which uniformly controls the area of contact between members to be welded at the completion of the extrusion process in order to produce consistent, high-quality welds exhibiting higher strength and superior durability.

19 Claims, 7 Drawing Figures

ELECTRODES FOR USE IN THE EXTRUSION-FUSION WELDING OF LEAD PARTS THROUGH AN APERTURE IN A BATTERY CASE

CROSS REFERENCE TO RELATED APPLICATIONS

This application is a continuation of U.S. patent application Ser. No. 934,046, filed Aug. 15, 1978, now abandoned, which is in turn a continuation-in-part of U.S. patent application Ser. No. 790,881, filed Apr. 26, 1977, entitled "ELECTRODES FOR USE IN THE EXTRUSION-FUSION WELDING OF LEAD PARTS THROUGH AN APERTURE IN A BATTERY CASE AND METHOD OF EXTRUDING FUSING AND FORGING LEAD CONNECTIONS IN BATTERY CASES", now U.S. Pat. No. 4,166,210, dated Aug. 28, 1979; the latter being incorporated by reference as if fully set forth herein.

BACKGROUND OF THE INVENTION

The present invention relates generally to apparatuses for making intercell welds in electric storage batteries and in particular to those apparatuses where electrodes are oriented on either side of a partition or other aperture in a battery case, lugs or other battery parts are placed at each side of that aperture, contact produced therebetween, current passed through the lead parts to melt the same, and pressure applied generally for the purpose of providing an electrical connection through the aperture. Such an apparatus is disclosed in U.S. Pat. No. 4,013,864.

It has long been known that lead parts on either side of a partition with an aperture formed therein can be welded through that aperture using any one of a number of techniques. In the lead acid battery art, the most common site for welding through an aperture is during the formation of intercell connections, that is, in making the electrical connections between one battery cell and the next and/or between the endmost battery cells and the exterior battery terminal of the battery. Since connections through apertures of this sort, in addition to being electrical, must provide a liquid seal from cell to cell to prevent "pumping", some attention has been directed in the art concerning various methods for insuring that an intercell connector, in addition to providing a good electrical connection, will also exhibit good sealing characteristics.

U.S. Pat. No. 3,687,734 generally discloses a connector for electrically connecting two elements of a storage battery through an aperture wherein at least one of the connector lugs is provided with a passage extending therethrough. Molten material from an internal portion of the connector exits through this passage during the heat fusion step as a result of pressure from a heat energy build-up. The patentee attempts by this structure to avoid the problem of blow-outs or lead expulsion which has been encountered by many practitioners in this art.

Another attempt to avoid "blow-out" is disclosed in U.S. Pat. No. 3,476,611 wherein intercell connections are made by a projection welding process from pins which extend through the partition between two adjacent battery compartments, which pins have dimensions such that, when they are fluidized during the process, the volume of the pin material does not exceed the volume defined by the walls of the opening.

Such attempts inherently involve tolerence and positioning problems during manufacture and assembly of the parts and battery. More recently, other methods have been developed for producing battery intercell electrical connections, which methods have generally been referred to as "extrusion-fusion" type methods. For example, in U.S. Pat. No. 3,793,086 a method is disclosed wherein flat surfaced connector lugs are placed on each side of the battery partition wall, adjacent an aperture. The connector lugs are extruded by a pair of opposed electrodes into the aperture until they meet, whereupon an electrical welding current is applied. When the welding current ceases, the connector is allowed to cool. U.S. Pat. No. 3,793,086 states:

"It should be emphasized that reduction of the initially applied shear force during the welding cycle is essential. If the high applied shear force is maintained during the welding cycle, molten lead will be squirted from the welding joint and an imperfect joint can result."

Another approach to the problem of blow-outs is that disclosed, for example, in U.S. Pat. No. 4,046,062 wherein separate hold-down sleeves are employed to clamp the lugs into sealing engagement with the partition wall aperture prior to and during the extrusion-fusion process. After clamping, metal is extruded until contact is made, electric current is passed through the extruded metal to melt it, and, under the continuing force of the electrodes, metal is caused to flow into any voids in the aperture while, at the same time, extruding more metal out of the lugs into the aperture until the aperture is packed full of lug metal.

In U.S. Pat. No. 3,869,316 a similar extrusion-fusion system is disclosed wherein high density polyurethane pads are provided around each of the electrodes to clamp the lugs tightly against the walls of the intercell connection during the extrusion, fusion and cooling steps.

In U.S. Pat. No. 3,723,699 the problem of blow-outs or lead expulsion is expressed in a projection welding context wherein the lugs are provided with upstanding annular ribs which surround the hole in the partition wall and are caused to bite into the partition wall, in an attempt to minimize flow and providing a good mechanical key between the lugs and partition wall, thus minimizing the possibility of relative sliding movement between the lugs and partition wall.

Accordingly, as seen from the above-described prior art references, considerable problems have been experienced with blow-outs, particularly where lead is extruded into the aperture of the partition with the intent of filling the same. Extrusion-fusion welding processes have nonetheless achieved considerable success in the industry.

Since the development of extrusion-fusion welding processes, other problems have also been encountered in controlling the types of welds which are obtained under actual production conditions in battery plants. It has long been known, for example, that variations in such parameters as the electrical welding current, squeezing pressure, and in the dimensions of the connector lugs and/or the partition or casing wall thickness has a direct effect on the quality of the weld. In the past, these parameters were adjusted and the resulting welds were then inspected to determine the quality thereof. This adjustment and inspection process continued until welds meeting the predetermined criteria were obtained. After this initial set-up procedure, which can be very time consuming and laborious, an attempt is then made to maintain these parameters constant throughout the subsequent production. Unfortunately, changes in one or more of these parameters during the ensuing production could have a detrimental effect on the quality of the welds produced thereby. In some cases, these welds will tend to overheat and blow out, while in other cases, cold or incomplete welds may be formed.

Although, as stated above, a number of conditions may account for the variability from weld to weld under conditions, I have found that the condition of the lugs contributes substantially to the great variability in weld performance. Lugs are typically cast of lead alloys which harden as they age, and, which during the preceeding battery manufacturing operations may acquire varying surface characteristics. For example, lugs which are cast in conventional parts molding machines may have a slight residue of oil or other film which adheres thereto from the casting machine (as, for example, films used to aid in release of the parts which are cast). Those lugs may then age in the battery plant for varying lenghts of time depending upon their sequence of use. During storage they may be exposed to varying quantities of lead oxide dust and/or other contaminants present in the battery plant, and may be subjected to various additional contaminants depending upon the operations employed to fuse those lugs to their respective straps. In some battery manufacturing plants, the lugs may be cast in a "Cast-on" machine or may be otherwise formed and fused to the straps with a much lesser degree of aging prior to final battery assembly. Once associated with the groups, the lugs are particularly prone to contamination as a result of shedding or other direct or indirect exposure to the active material of their associated groups or elements. Finally, depending upon the manufacturing process employed to make the cases, variable contaminations of the lug surfaces routinely occurs.

Prior art extrusion-fusion techniques, to the extent they have attempted to control parameters of surface contamination, tend to rely on sensing the establishment of an electrical current path through the lugs at or near the completion of the extrusion process, that is, at the time contact is created between the lugs within the cellular aperture. Unfortunately, variations in surface contaminations of the lugs considerably change the surface resistance of the lugs; therefore, techniques which sense the establishment of a certain degree of electrical contact within the aperture tend to begin the weld cycle relatively earlier or later depending upon how dirty the lug surfaces are at their points of contact, i.e., how much lug contact area need be established in order to trigger the weld cycle. Other prior art techniques have focused upon controlling the pressure of extrusion to thereby presumably establish a uniform contact area between the lugs, regardless of their surfaces contamination. Due to the variability in aging processes however, and the consequent variations in the hardness of the lugs to be extruded (depending upon the age of those lugs), close control of extrusion pressure from weld to weld results in variations of contact area between the lugs.

Other prior art techniques have used mechanical stops to limit the extrusion of the extruding apparatus in order to establish a uniform contact area between the lugs. However, variations in lug dimensions will effect the contact area thereby rendering this technique less than satisfactory.

SUMMARY OF THE INVENTION

The present invention generally relates to a modified electrode configuration for use in an extrusion-fusion type of welding system, and more particularly, a welding system which obviates any necessity for time consuming, laborious set-up procedures, variable pressure control, separate clamps, or particular lug or aperture configurations, and which produces an extremely homogeneous weld with a uniform grain structure and surprising strength heretofore unknown and unachievable in battery manufacture.

The superior characteristics of the welds (and batteries produced therewith) result from numerous features incorporated in applicant's novel electrodes. One such feature is the novel electrode tip of applicant's invention. Applicant has recognized that the extrusion portion of the electrode, that is, the tip portion which initially upsets the metal to cause the initial contact thereof within the aperture, should be disposed generally away from a forging portion, that is, a portion which, in addition to other functions, tends to limit the extrusion of the electrode during the cold extrusion phase, whereby the degree of metal to metal contact within the aperture is uniformly limited.

Applicant has also found that by providing an annular forging portion on the electrode surrounding the aperture to forge the lug around the aperture at least during the aperture-filling compression process, that the problem of blow-outs is eliminated and a substantially denser, stronger, gas-free, homogeneous weld is attained. In the preferred embodiment, the annular forging portion is configured with a contacting surface which is forced into the lug in order to create a sealing zone of high compression lead surrounding the aperture. The forging portion also includes an inner beveled surface which additionally forges lead adjacent to the high compression sealing zone towards the central axis of the aperture. The annular forging portion further acts as a cold heat sink for lead disposed adjacent to that portion of the electrodes, to prevent the melting of same.

Applicant has found that it is not necessary to use differential pressures during the initial upsetting and subsequent compression processes. Accordingly, far greater lug, partition and aperture tolerances are established so that weld powers, hold-times and hold-pressures exhibit substantially greater latitudes than heretofore exhibited by prior art devices.

Accordingly, a primary object of the present invention is the provision of a novel batery having intercell welds exhibiting superior strength and quality.

Another object of the present invention is the provision of an extrusion-fusion type of apparatus for forming intercell welds through an aperture in a lead acid storage battery wherein the degree of metal to metal contact within the aperture is uniformly limited to a predetermined magnitude prior to fusion.

A further object of the present invention is the provision of an apparatus for producing intercell welds in automotive storage batteries while overcoming attendant problems with blow-out.

An additional object of the present invention is the provision of an extrusion-fusion type of apparatus for forming intercell welds in a lead acid storage battery wherein significantly greater lug, partition and aperture misalignments may be suitably accommodated without re-adjusting to compensate for same.

DETAILED DESCRIPTION OF THE DRAWINGS

Figure 1:
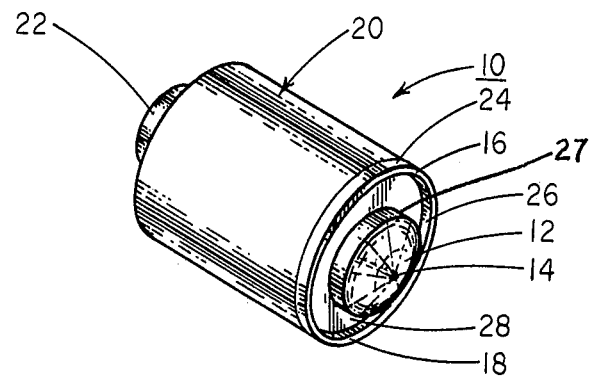
FIG. 1 is a perspective view of the preferred embodiment electrode of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1, there is shown the improved electrode generally referred to as 10. The electrode 10 comprises a conical extrusion portion 12 having a vertex 14. The conical extrusion portion 12 is surrounded by a concentric, circular forging portion 16 having a contacting surface 18, which is more clearly shown in FIGS. 2–6. Both the conical extrusion portion 12 and the forging portion 16 are disposed on one end of a cylindrical body 20. The conical extrusion portion 12 is preferably positioned coaxially with the cylindrical body 20 with the plane of the contacting surface 18 being substantially perpendicular to the coincident axes. A jaw mount 22 is provided on the opposite end of the cylindrical body 20 from conical extrusion portion 12 and forging portion 16 in order to enable the electrode to be conveniently mounted on welding jaws (not shown). As shown more clearly in FIG. 2, the forging portion includes an outer beveled surface 24 and an inner beveled surface 26 both of which slope away from the contacting surface 18. The outer beveled surface 24 is the result of the inclusion of a draft on the outer end surface of the forging portion 16. In the preferred embodiment, the draft angle is three degrees. The inner beveled surface 26 terminates in a recess 28, the surface of which is substantially perpendicular to the axis of the cylindrical body 20. It has been empirically determined that the angle of the inner beveled surface 26 can range between three degrees and fifteen degrees and still be effective in minimizing weld blow-outs as will be subsequently described. In the preferred embodiment, the angle is between five and eight degrees. A surface 27 extends from the base of the conical extrusion portion 12 to the surface of the recess 28 at a draft angle which, in the preferred embodiment, is equal to three degrees. The distance between the base of the conical portion 12 and the surface of the recess 28 is substantially equal to one-sixteenth of an inch in the preferred embodiment. The electrode 10 is constructed of a material having good electrical conductivity and hardness charactristics.

Figure 2:
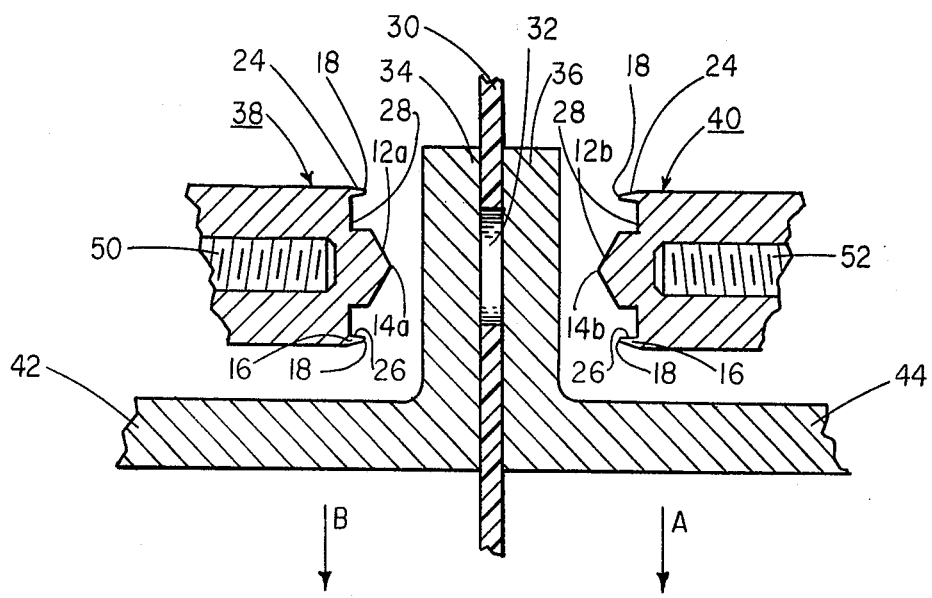
FIG. 2 is a cross-section of the portion of a battery showing flat lugs disposed on either side of an intercell partition with an aperture formed therein and with two preferred embodiment electrodes similar to that illustrated in FIG. 1 above shown disposed in their standby positions spaced apart from the lugs and oriented generally axially with the aperture of the partition through which the intercell connection is to be formed.

Referring now to FIG. 2, there is shown a cross-section of a portion of a battery partition 30 having an aperture 32 formed therein and having lugs 34 and 36 disposed thereagainst to overlap aperture 32. The orientation of the electrodes, designated generally 38 and 40, with respect to the aperture prior to welding is also illustrated. The lugs 34 and 36 are shown to comprise generally flat surfaces which may lie up against the complimentally opposing surfaces of partition 30. The lugs are selected to be of a width and height so that precise alignment with respect to the aperture 32 is not necessary. The importance of this fact resides in part upon the fact that each lug 34 and 36 is formed or cast as part of straps 42 and 44 respectively, which, although not shown, are welded to a plurality of battery plates which make up a group of elements of the battery and which, during the assembly process, are slipped into the case generally in the direction shown by arrows A and B in FIG. 2, so that portions of the lugs 34 and 36 overlap the partition aperture 32.

It will also be noted from FIG. 2 that the use of lugs 34 and 36 with flat surfaces disposed thereon allow the finished groups to be inserted down into the case without fear that any particular portion of the lugs will hang up on the partition, and further without the problems attendant with projection welding techniques for first getting the groups into the battery cells and then for positioning the projections in the aperture, as more fully described for those techniques in U.S. Pat. No. 3,364,076.

As seen in FIG. 2, the electrodes designated generally 38 and 40 are aligned substantially coaxially with aperture 32. The conical extrusion portions 12a and 12b terminate in vertexes 14a and 14b for initially contacting the lugs and for extruding the same into the aperture 32. The diameter of the base of the conical extrusion portion 12 is substantially equal to the diameter of the aperture 32. However, when used in a production environment, it may be necessary to make the diameter of the base smaller than the diameter of the aperture in order to compensate for misalignment due to production alignment tolerances. A misalignment, wherein a portion of the conical extrusion portion overlaps a portion of the edge of the aperture, can cause pinching and plastic inclusions in the weld which detrimentally affect the quality of the weld. Consequently, the phase "substantially equal to" is intended to include differences in diameters which are necessitated by practical implementation considerations such as compensation for production alignment tolerances. In the preferred embodiment, when welding through an aperture having a diameter substantially equal to seven-sixteenths of an inch, the diameter of the base of the conical extrusion portion is substantially equal to three-eights of an inch. With a base diameter equal to three-eighths of an inch, the height of the vertex 14 should lie within a range of one-thirty-second of an inch to three-thirty-seconds of an inch and is preferably one-sixteenth of an inch. This range of heights has been empirically determined and relates to the functional requirements of the conical extrusion portion 12 as will be hereinafter described.

The diameter of the concentric, circular forging portion must be small enough to preclude overhanging an edge of the lug, but large enough to prevent overlapping any portion of the aperture edge in order to minimize blow-outs in the weld and also large enough to stall further cold extrusion of the lugs, both of which features will be more fully described hereinafter. The diameter should fall within the range of one-half to five-eighths inch. In the preferred embodiment, the diameter of the circular contacting surface 18 is substantially equal to five-eighths of an inch. Threaded bores 50 and 52 are additionally provided in each electrode to receive threaded shafts for mounting the electrode jaws (not shown). As previously stated, the electrodes should be of sufficient hardness to exhibit acceptable durability during the lead and lead alloy working processes to which they are to be subjected. For this purpose, No. 25 beryllium copper is the preferred material from which the extrusion portion 12 and foring portion 16 may be milled or otherwise formed.

Figure 3:
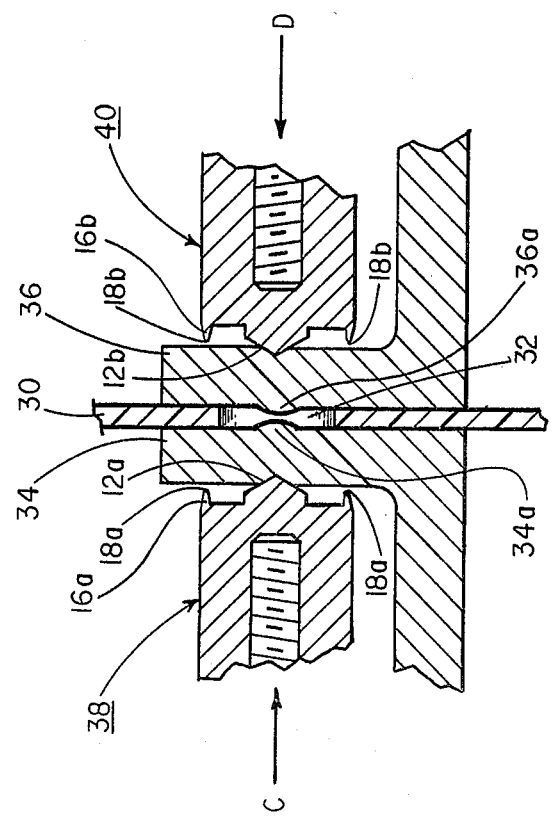
FIG. 3 is a cross-section similar to the view shown in FIG. 2, wherein the electrodes have been moved into contact with the lugs and have begun to extrude portions of those lugs into the aperture formed in the intercell partition.

Referring now to FIG. 3, electrodes 38 and 40 have begun to move together in the directions of arrows C and D to a point where the conical extrusion portions 12a and 12b have begun to contact lugs 34 and 36 into extruded portions 34a and 36a of those lugs into the aperture 32. The conical shape of the extrusion portion 12 causes the lug material to be forced into the aperture and away from its center, a wedge-like effect which tends to fill the aperture with lug material. At the position illustrated in FIG. 3, the contacting surfaces 18a and 18b of the forging portions 16a and 16b have not yet begun to contact the lugs 34 and 36.

Figure 4:
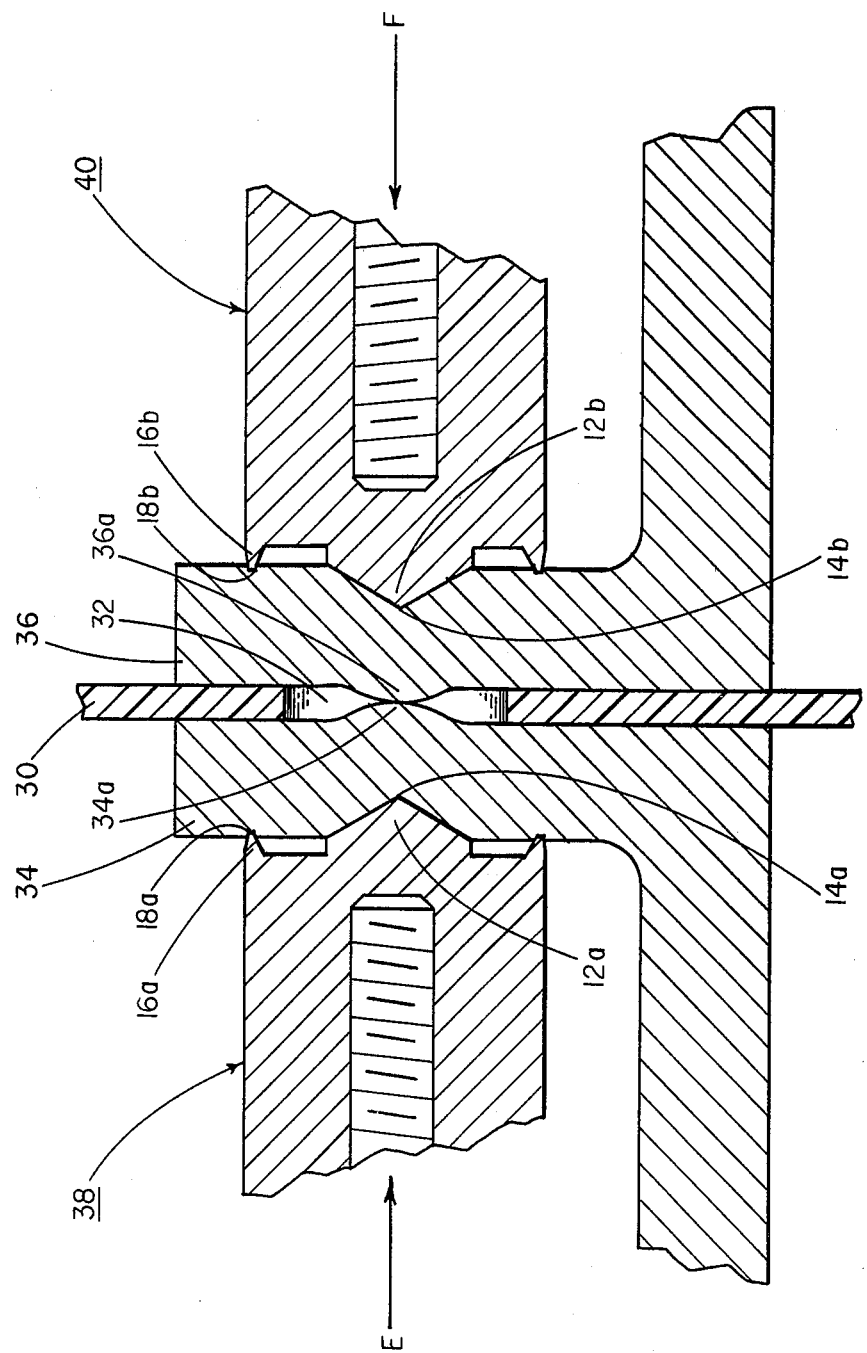
FIG. 4 is a greatly enlarged cross-section similar to FIGS. 2 and 3, wherein the electrodes have proceeded with the forging step to a point where metal-to-metal contact between the lugs is estabished within the aperture and at a point where the contacting surface of the forging portions of the electrodes have contacted the lugs.

FIG. 4, which is a greatly enlarged cross-section similar to FIG. 3, illustrates the continued movement of the electrodes together to a point where the contacting surfaces 18a and 18b of the forging portions 16a and 16b have contacted the surfaces of the lugs 34 and 36 and are slightly embedded therein at which point further movement of the electrodes is stalled. In the preferred embodiment, the contacting surfaces become embedded to a depth equal to about 0.005 inch before the movement of the electrodes actually stops. At this point, extruded portions 34a and 36a have made the desired degree of contact within the aperture 32. The force supplied to the electrodes 38 and 40 which urges them in the directions indicated by the arrows E and F is of such a magnitude that the extrusion portions 12a and 12b will extrude the hardest of the lugs to be welded, while at the same time being insufficient to overcome the stalling effect of the forging portions 16a and 16b in the softest of lugs after the contacting surfaces 18a and 18b of the forging portions 16a and 16b have made contact with the surfaces of the lugs 34 and 36, respectively. In the preferred embodiment, with diameter of the contacting surface being equal to five-eighths of an inch, this force is substantially equal to 680 pounds. The stalling effect of the forging portion 16a and 16b effectively limits the extrusion movement of each of the electrodes to the axial distance measured from the vertex 14 of the extrusion portion 12 to the intersection of the plane containing the contacting surface 18 with the axis of the electrode. In the preferred embodiment, this distance is substantially equal to one-half the thickness of the battery partition 30. When used for welding through battery partitions having nominal thickness of 0.070 inch, the contacting surface 18 is 0.035 inch from the vertex 14. Accordingly, it may be seen that for this phase of the process, the relative thickness of the lugs 34 and 36 are immaterial to the proper functioning of the extruding portions 12a and 12b and the proper contacting area will always be formed within the aperture upon engagement of the contacting surfaces 18a and 18b with the lugs 34 and 36, respectively.

Figure 5:
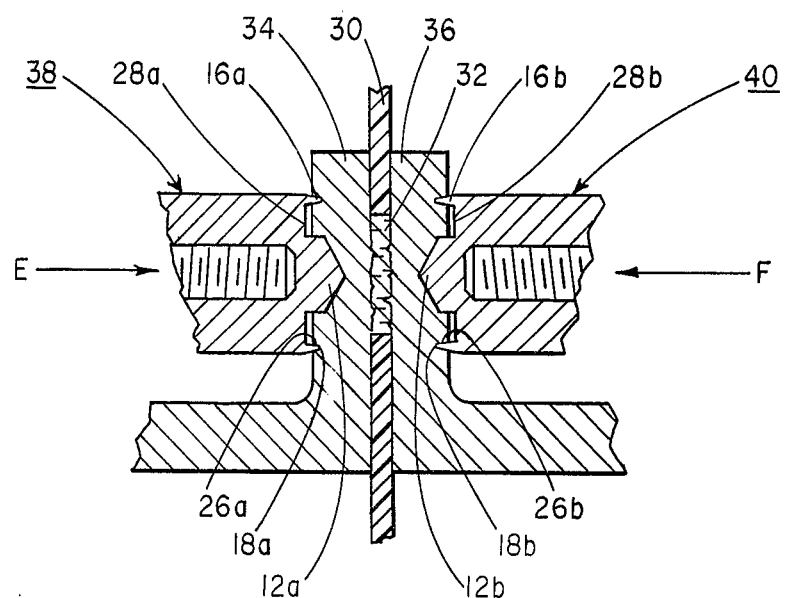
FIG. 5 is a cross-section similar to FIGS. 2 and 3, wherein fluidization of lead within the aperture has been effected and the electrodes bought further together so that the molten metal fills the aperture.

After the proper contact area has been established between the lug portions 34a and 36a, a current is applied by the electrodes through the lugs in order to fluidize the lead within the aperture. This current is applied immediately upon the establishment of the proper metal-to-metal contact area within the aperture and the movement of the electrodes together continues in a smooth and uninterrupted fashion as shown in FIG. 5, wherein it may be seen that the forging portions 16a and 16b, in combination with the extrusion portions 12a and 12b, have continued to move together in the directions E and F to force the lead to completely fill the aperture 32 in the partition 30. In the preferred embodiment, each electrode continues to move for a distance substantially equal to 0.025 inch.

As previously stated, the relationship of the height of the conical portion 12 verses the diameter of its base, a relationship which defines the included angle or sharpness of the cone, has been empirically determined. With a base diameter of ⅜ inch, the sharpest cone has a height of 3/32 inch and the flattest has a height of 1/32 inch. It has been found that sharper cones, cannot adequately function to follow in and hydraulically fill the aperture with fluidized lead since the forging portion would bottom out before the aperture has become filled. This creates voids or "worm holes" which have a detrimental effect on the quality of the weld. In addition, the greater height of the cone causes a deeper depression 76 (see FIG. 7) in the lug which would tend to weaken the completed weld. In addition, it has been found that flatter cones do not permit the uniform establishment of the proper initial contact area within the aperture. Also, an entirely flat extrusion portion was found to cause plastic inclusions in the weld as well as non-uniform initial heat contact area.

It should be noted that as the aperture 32 is being filled with lead, the forging portions 16a and 16b are further embedded into the exterior surfaces of the lugs 34 and 36. In the preferred embodiment, the contacting surface 18 of each electrode becomes embedded in the lug to a total depth of approximately 0.030 inch. This penetration of the contacting surfaces 18a and 18b of the forging portions 16a and 16b into the surface of the lugs 34 and 36, respectively, during fluidization of the lead within the aperture will prevent the expulsion of molten lead from the aperture, commonly known as blowout.

At the present time, it is not fully understood how the forging portions 16a and 16b act within this environment to eliminate problems of blowout. It is theorized that the circular contacting surface 18 which surrounds the aperture produces an annular zone of high compression lead which acts as a seal preventing lead expulsion from the weld zone. It is further theorized that the inner beveled surface 26 of the forging portion 16, in acting to form or force that portion of the lug interiorly adjacent the contacting surface 18 toward the weld zones sets up stresses internally within the lug which additionally act to confine the weld nuggets to prevent expulsion. Finally, the depth of the recess 28 between the extrusion portion 12 and the forging portion 16 is believed to provide a certain degree of relief for lead squeezed between the electrodes, and that lead may actually be forged up into the annular recess 28 in the electrode rather than be expulsed from the weld zone.

Figure 6:
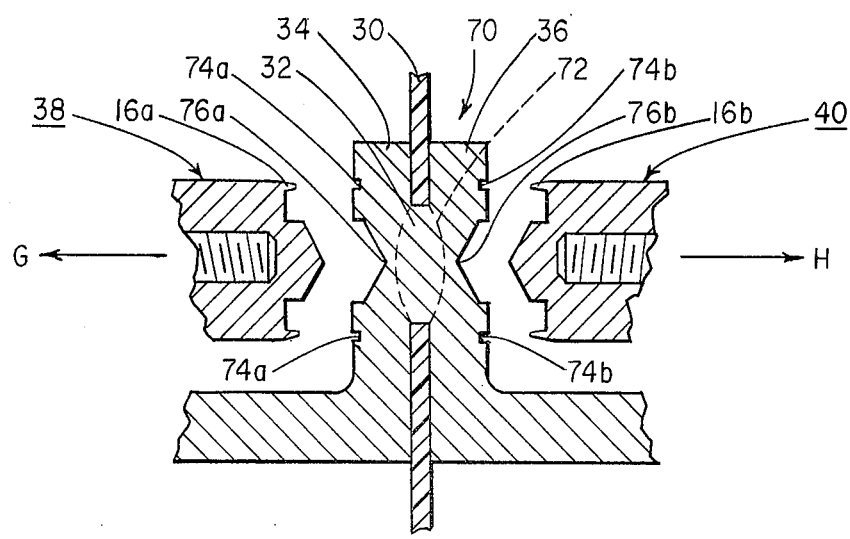
FIG. 6 is a cross-section similar to FIGS. 3–5, wherein the connection is complete and the electrodes have been withdrawn therefrom, showing the completed weld configuration.

Referring now in particular to FIG. 6 wherein the electrodes 38 and 40 are being withdrawn in the directions G and H, respectively, to reveal a finished weld, it may be seen that the final intercell connection designated generally 70 is extremely homogeneous and completely lacking the air pockets or "worm holes" which typify welds produced by prior art processes. At the present time, it is also not understood why the apparatus of the present invention consistently produced weld nuggets which, upon sectioning and etching to show grain structure, exhibit an extremely wide weld zone 72 which is generally disposed in the configuration shown in FIG. 6.

Figure 7:
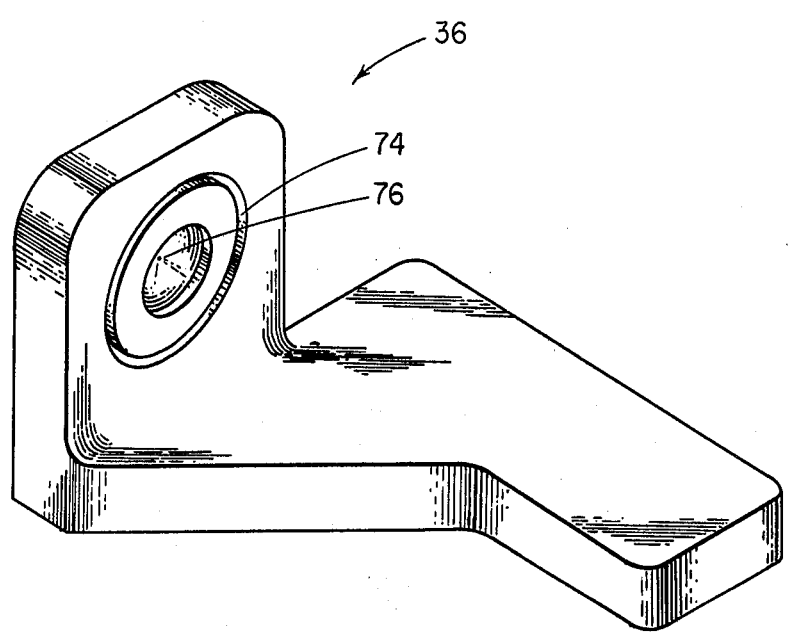
FIG. 7 is a perspective view of a strap and lug showing the external appearance of a lug in which an intercell connection in accordance with the present invention has been made.

In FIG. 6 and FIG. 7, the final configuration of the intercell connection produced by the improved electrode of the present invention is clearly illustrated. This intercell connection is, as aforesaid, characterized by large uniform weld nugget 72 which is disposed to completely fill the aperture 32 within partition 30. Annular depressions 74a and 74b which have been formed by the forging portions 16a and 16b of the electrodes 38 and 40, respectively, are seen encircling the center of the connection, while central concave, conical depressions 76a and 76b are disposed in the center of the intercell connection.

In order to determine the comparative strengths of the intercell weld illustrated in FIG. 6, the weld produced using the improved electrodes of the present invention was tested against conventional welds produced by a conventional "stepped electrode". Shear tests were conducted on standard lead and antimony lugs which were welded with similar currents through partition apertures. In all instances, a three and one-quarter inch air cylinder was utilized in order to provide shearing force across the lug on one side of the partition while the lug on the other side of the partition was held rigidly. The values obtained by these tests represent the air pressure supplied to the three and one-quarter inch cylinder, and, accordingly, are proportional to the pounds of shear force supplied to each intercell connection in order to break the same. Intercell connections produced using the prior art "stepped electrodes" are found to shear generally at between 100 to 120 pounds of air pressure. By comparison, intercell connections produced by the improved electrodes of the present invention generally sheared between about 190 to 200 pounds of pressure. Accordingly, use of applicant's invention enables the formation of intercell welds which are not sensitive to dimensional irregularities in the lugs to be welded or the precise alignment of those lugs with respect to the aperture through the intercell partition is to be made.

It will be understood that various changes in the details, materials and arrangements of parts which have been herein described and illustrated in order to explain the nature of this invention may be made by those skilled in the art within the principle and scope of the invention as expressed in the following claims.

What is claimed is:

1. In an apparatus having electrodes for extruding, in response to a force applied along a predetermined axis, and fusing, in response to an applied electrical current, lead parts through an aperture in a battery case to form a connection therethrough, an improved electrode comprising a centrally disposed extrusion portion; and means for limiting the degree of contact between the lead parts within said aperture prior to the application of said electrical current, operatively associated with said extrusion portion and forming part of said electrode.

2. The invention of claim 1 wherein said extrusion portion comprises a conical projection having an axis which substantially coincides with said predetermined axis and a vertex, said vertex being displaced from said means for limiting contact by a predetermined distance along said predetermined axis.

3. The invention of claim 2 wherein said means for limiting contact comprises a forging portion which is annularly disposed around said conical extrusion portion.

4. The invention of claim 3 wherein said forging portion includes an annular contacting surface disposed around said conical extrusion portion.

5. The invention of claim 4 wherein said forging portion includes an inner beveled surface which slopes away from said contacting surface toward said conical extrusion portion.

6. The invention of claim 5 wherein said annular contacting surface is disposed in a plane which is perpendicular to the axis of said conical extrusion portion and intersects said axis at said predetermined distance from said vertex.

7. The invention of claim 6 wherein said predetermined distance is substantially equal to one-half the thickness of the portion of the battery case through which said aperture is formed.

8. The invention of claim 7 wherein said inner beveled surface terminates in an annular recess surface between said extrusion portion and said forging portion.

9. The invention of claim 8 wherein said aperture is circular and said conical extrusion portion includes a circular base, the diameter of which is substantially equal to the diameter of said aperture.

10. The invention of claim 1 wherein said extrusion portion comprises a right circular conical projection having a base, an axis which substantially coincides with said predetermined axis, and a vertex, said vertex being displaced from said means for limiting contact by a predetermined distance along said predetermined axis.

11. The invention of claim 10 wherein said means for limiting contact comprises a forging portion which is circular and is coaxially disposed around said conical extrusion portion.

12. The invention of claim 11 wherein said forging portion includes a planar, circular contacting surface having inner and outer perimeters which are coaxially disposed around said conical extrusion portion, the plane of said contacting surface being perpendicular to the axis of said conical extrusion portion and intersecting said axis at said predetermined distance from said vertex.

13. The invention of claim 12 wherein said circular forging portion includes an inner beveled surface which slopes away from said inner perimeter toward said conical extrusion portion at a predetermined bevel angle.

14. The invention of claim 13 wherein said inner beveled surface terminates in a circular recess surface between said extrusion portion and said forging portion.

15. The invention of claim 14 wherein said predetermined bevel angle has a magnitude within a range of three degrees to fifteen degrees.

16. The invention of claim 15 wherein the ratio of the height to the diameter of the base of said right circular conical extrusion portion lies in a range of from 1:12 to 1:4.

17. The invention of claim 1 wherein said extrusion portion and said limiting means are associated with a terminating end of said electrode.

18. The invention of claim 17 wherein said limiting means extends outwardly from the terminating end of said electrode, and is peripherally spaced from said extrusion portion.

19. In an apparatus having electrodes for extruding, in response to a force applied along a predetermined axis, and fusing, in response to an applied electrical current, lead parts through an aperture in a battery case to form a connection therethrough, an improved electrode comprising a centrally disposed extrusion portion, for extruding portions of said lead parts into said aperture; and means for contacting other portions of said lead parts surrounding said extruded portions and for limiting the degree of contact between said lead parts within said aperture, prior to the application of said electrical current, in accordance with the degree of contact between said contacting means and said other portions of said lead parts.

* * * * *